(12) United States Patent
Nagai

(10) Patent No.: US 9,126,845 B2
(45) Date of Patent: Sep. 8, 2015

(54) LITHIUM SECONDARY BATTERY

(75) Inventor: Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/122,213

(22) PCT Filed: May 31, 2011

(86) PCT No.: PCT/JP2011/062525
§ 371 (c)(1),
(2), (4) Date: Nov. 25, 2013

(87) PCT Pub. No.: WO2012/164693
PCT Pub. Date: Dec. 6, 2012

(65) Prior Publication Data
US 2014/0127582 A1    May 8, 2014

(51) Int. Cl.
*H01M 4/525* (2010.01)
*C01D 15/02* (2006.01)
*C01G 53/00* (2006.01)
*H01M 4/36* (2006.01)
*H01M 4/505* (2010.01)
*H01M 10/052* (2010.01)

(52) U.S. Cl.
CPC ............ *C01D 15/02* (2013.01); *C01G 53/42* (2013.01); *C01G 53/44* (2013.01); *H01M 4/366* (2013.01); *H01M 4/505* (2013.01); *H01M 4/525* (2013.01); *C01P 2002/54* (2013.01); *C01P 2006/12* (2013.01); *C01P 2006/40* (2013.01); *C01P 2006/80* (2013.01); *H01M 10/052* (2013.01); *Y02E 60/122* (2013.01)

(58) Field of Classification Search
CPC ...... H01M 4/505; H01M 4/525; H01M 4/366
USPC ......................... 429/231.95, 231.8
See application file for complete search history.

(56) References Cited

U.S. PATENT DOCUMENTS

2008/0131778 A1   6/2008  Watanabe et al.
2009/0035659 A1*  2/2009  Takeuchi et al. .............. 429/223
2010/0209771 A1   8/2010  Shizuka et al.
(Continued)

FOREIGN PATENT DOCUMENTS

CN    101796672    8/2010
CN    101997113    3/2011
(Continued)

*Primary Examiner* — Cynthia H Kelly
*Assistant Examiner* — Monique Wills
(74) *Attorney, Agent, or Firm* — Finnegan, Henderson, Farabow, Garrett & Dunner, LLP

(57) ABSTRACT

The present invention provides a lithium secondary battery having a great output power in a low SOC range and a positive electrode active material for use in the battery. The battery comprises a positive electrode, a negative electrode and a non-aqueous electrolyte. The positive electrode comprises a positive electrode active material in a form of secondary particles as aggregates of primary particles of a lithium transition metal oxide. The positive electrode active material comprises at least one species of Ni, Co and Mn, and further comprises W and Mg. The W is present, concentrated on surfaces of the primary particles while the Mg is present throughout the primary particles. The Mg content in the positive electrode active material is higher than 50 ppm relative, to the total amount of the active material based on the mass.

9 Claims, 5 Drawing Sheets

(56) References Cited

U.S. PATENT DOCUMENTS

2011/0059363 A1* 3/2011 Imanari et al. ............... 429/224
2012/0270107 A1 10/2012 Toya et al.

FOREIGN PATENT DOCUMENTS

| JP | 2006-310181 | 11/2006 |
|----|-------------|---------|
| JP | 2007-188699 | 7/2007 |
| JP | 2008-16243 | 1/2008 |
| JP | 2009-81130 | 4/2009 |
| JP | 2011-116580 | 6/2011 |
| KR | 10-2010-0042145 | 4/2010 |

* cited by examiner

LITHIUM SECONDARY BATTERY

CROSS-REFERENCE TO RELATED APPLICATIONS

This application is a national phase application of International Application No. PCT/JP2011/062525, filed May 31, 2011, the content of which is incorporated herein by reference.

FIELD OF INVENTION

The present invention relates to lithium secondary battery using a lithium transition metal oxide as a positive electrode active material and a positive electrode active material for the battery.

BACKGROUND ART

Lithium secondary batteries are becoming more and more important as power supplies loaded on vehicles or power sources fix PCs, mobile devices, and so on. In particular, lithium-ion secondary batteries, which are lightweight, yet provide high energy densities, are expected as preferable high-power batteries for vehicles. A typical example of a positive electrode active material used in lithium secondary batteries is a composite oxide containing lithium (Li) and at least one transition metal (which may also be referred to as a lithium transition metal oxide, hereinafter). Technical literature relating to lithium secondary batteries includes Patent Documents 1 to 3.

CITATION LIST

Patent Literature

[Patent Document 1] Japanese Patent Application Publication No. 2008-016243
[Patent Document 2] Japanese Patent Application Publication No. 2007-188699
[Patent Document 3] Japanese Patent Application Publication No. 2006-310181

SUMMARY OF INVENTION

Technical Problem

In general, with a lithium secondary battery, as the SOC (state of charge) decreases, the output power decreased. If the output power in a low SOC range can be improved, desirable output power can be obtained over a wider SOC range, whereby the battery can provide a larger energy per unit volume or unit mass available for effective usage. This is especially meaningful, for instance, in batteries (e.g., vehicle-driving power supplies) to be loaded on vehicles for which high output power and high energy densities are required.

An objective of the present invention is to provide a lithium secondary battery having great output power in a low SOC range. A related other objective is to provide a method for producing a positive electrode active material intended for such lithium secondary batteries.

Solution to Problem

The present invention provides a lithium secondary battery comprising a positive electrode, a negative electrode, and a non-aqueous electrolyte. The positive electrode comprises a positive electrode active material in a form of secondary particles as aggregates of primary particles of a lithium transition metal oxide. The positive electrode active material comprises at least one species of nickel (Ni), cobalt (Co) and manganese (Mn). The positive electrode active material further comprises tungsten (W) and magnesium (Mg). The W is present, concentrated on surfaces (which can be understood as grain boundaries) of the primary particles. The Mg is present throughout the primary particles. The Mg content in the positive electrode active material is higher than 50 ppm relative to the total amount of the positive electrode active material based on the mass.

Because of the combined effect by the concentrated presence of W on surfaces of primary particles of the positive electrode active material and the presence of Mg throughout the primary particles, a lithium secondary battery having such a constitution can provide great output power in a low SOC range. By this, the range where desirable output power can be obtained extends to a low SOC side; and therefore, the lithium secondary battery can be used effectively over a wider SOC range. A Mg content exceeding 50 ppm (e.g., 100 ppm or higher) can produce a more certain effect to increase the output power in a low SOC range.

As used herein, the term "lithium secondary battery" refers to a secondary battery that uses lithium ion as an electrolyte ion, with charging and discharging of the battery being achieved by transport of charges carried by lithium ions between the positive and negative electrodes. Batteries generally referred to as lithium-ion secondary batteries are typical examples included in the lithium secondary battery in the present description. As used herein, the term "active material" refers to a substance capable of reversely storing and releasing (typically, by allowing intercalation and deintercalation of) a chemical species (i.e., lithium ion herein) that acts as a charge carrier in a secondary battery. As used herein, the term "SOC" refers to the state of charge of the battery based on a typical voltage range over which the battery is used, unless otherwise specified. For example, in a lithium-ion secondary battery comprising a lithium transition metal oxide having a layered structure, it refers to the state of charge based on the rated capacity measured at a voltage across the terminals of 4.1 V (upper voltage limit) to 3.0 V (lower voltage limit). Typically, the rated capacity determined under the same conditions as the rated capacity measurements for test batteries described later.

The Mg content in the positive electrode active material is preferably 1000 ppm or lower (e.g., 100 ppm or higher, but 800 ppm or lower) relative to the total amount of the positive electrode active material based on mass. With a too high Mg content, the output power (e.g., output power at −30° C.) around the mid SOC range may tend to decrease.

The W content in the positive electrode active material is preferably 0.05% by mole or higher, but 2% by mole or lower, with the combined amount of Ni, Co and Mn contained in the positive electrode active material being 100% by mole. According to a positive electrode active material having such a composition, a higher performance battery can be obtained.

In a preferable embodiment of the art disclosed herein, the lithium transition metal oxide is an oxide comprising at least Ni as its constituent metal and having a layered structure. For example, preferable is a lithium transition metal oxide containing all Ni, Co and Mn as its constituent metals (or "LiNiCoMn oxide" hereinafter) and having a layered structure. According to a positive electrode active material having such a composition, a higher performance lithium secondary battery can be obtained.

The present invention also provides a method for producing a positive electrode active material for use in a lithium secondary battery, with the positive electrode active material being in a form of secondary particles as aggregates of primary particles of a lithium transition metal oxide (typically, a lithium transition metal oxide having a layered structure), comprising at least one species of Ni, Co and Mn, and further comprising W and Mg. The method comprises preparing an aqueous solution (typically an acidic aqueous solution) $Aq_A$ containing the at least one species of Ni, Co and Mn as well as Mg. It also comprises preparing an aqueous solution $Aq_C$ containing W. It thither comprises mixing the aqueous solution $Aq_A$ and the aqueous solution $Aq_C$ under a basic condition to precipitate a hydroxide containing the at least one species of Ni, Co and Mn as well as Mg and W. The method typically comprises further mixing the hydroxide and a lithium compound. It may also comprise calcining the mixture to form the lithium transition metal oxide.

As such, in the positive electrode active material production method disclosed herein, an aqueous solution $Aq_A$ containing at least one species of Ni, Co and Mn as well as Mg and an aqueous solution $Aq_C$ containing W are prepared as separate aqueous solutions; and the aqueous solution $Aq_A$ and the aqueous solution $Aq_C$ are mixed under a basic condition (i.e., under a condition at pH above 7) to precipitate a hydroxide (or "a precursor hydroxide" hereinafter) containing the at least one species of Ni, Co and Mn as well as Mg and W. The precursor hydroxide is then mixed with a lithium compound (Li source) and calcined. Such a method is preferable for producing a positive electrode active material in a form of secondary particles as aggregates of primary particles of a lithium transition metal oxide, wherein Mg is present throughout the primary particles while W is present, concentrated on surfaces of the primary particles. Thus, the method can be preferably applied for producing a positive electrode active material disclosed herein, for producing a positive electrode comprising the positive electrode active material intended for use in a lithium secondary battery for producing a lithium secondary battery comprising the positive electrode active material, and so on.

It is preferable to precipitate the precursor hydroxide while keeping the pH at 11 to 14 (e.g., pH 11.5 to 12.5, typically around pH 12). According to a positive electrode active material obtained with such a precursor hydroxide, can be obtained a higher performance lithium secondary battery (e.g., having great output power in a low SOC range). The pH value in the present description refers to a pH value based on a liquid temperature of 25° C.

When carrying out the mixing under the basic condition, a basic aqueous solution can be prepared separately from the aqueous solution $Aq_A$ and the aqueous solution $Aq_C$, and the basic condition can be maintained (e.g., at pH 11 to 14) with the basic aqueous solution. As the basic aqueous solution, can be preferably used an aqueous solution containing at least ammonia. A preferable embodiment of the art disclosed herein is an embodiment using a mixed solution of ammonia water and an aqueous sodium hydroxide solution as the basic aqueous solution. Another preferable embodiment is an embodiment using two or more different basic aqueous solutions (e.g., ammonia water and aqueous sodium hydroxide solution) separately (e.g., the respective basic aqueous solutions are supplied to a reaction vessel independently). These embodiments can be combined as well.

The present invention provides a positive electrode active material produced by a method disclosed herein. The present invention also provides a positive electrode for a lithium secondary battery, comprising a positive electrode active material disclosed herein (which may be a positive electrode active material produced by a method disclosed herein). It further provides a lithium secondary battery comprising such a positive electrode.

As described above, the lithium secondary battery (typically, a lithium-ion secondary battery) disclosed herein provides good output power in a low SOC range, it can be preferably used as a driving power supply, etc., over a wider SOC range. Thus, in another aspect, the present invention provides, as shown in FIG. 8, for example, a vehicle 1 comprising a lithium secondary battery 100 disclosed herein (which may be a battery pack comprising multiple batteries connected linearly in typical). In particular, a vehicle (automobile) comprising such a lithium secondary battery as a driving power supply (typically, a driving power supply in a hybrid vehicle or an electric vehicle) is preferable. The present invention also provides a lithium secondary battery 100 for use as a vehicle-driving power supply.

EMBODIMENTS OF INVENTION

Figure 1:
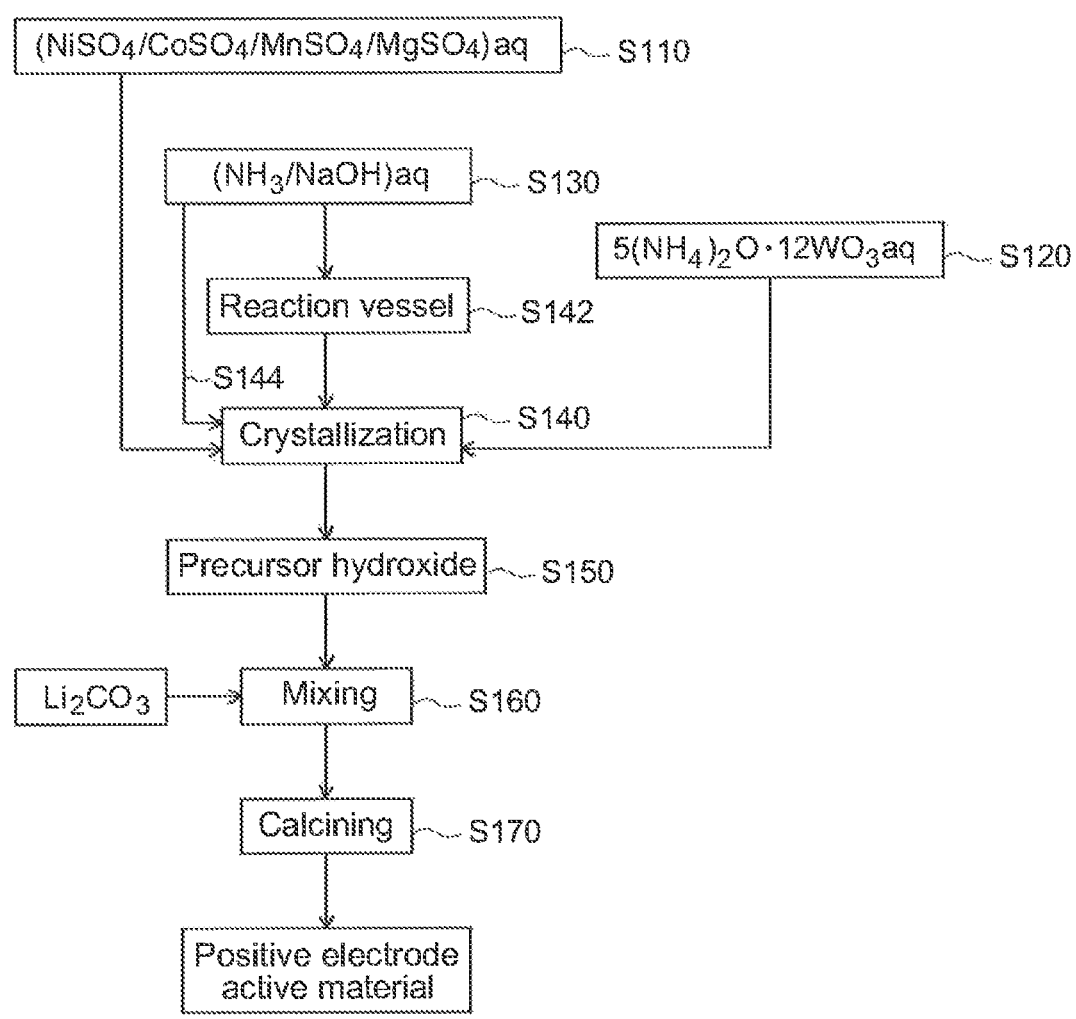
FIG. 1 shows a flow chart summarizing the positive electrode active material production method according to an embodiment.

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, members and sites providing the same effect may be indicated by a common reference numeral, and redundant descriptions may be omitted or simplified.

<<Positive Electrode Active Material>>

The positive electrode active material in the art disclosed herein is in a form of secondary particles as aggregates of primary particles of a lithium transition metal oxide. The lithium transition metal oxide is a lithium oxide comprising at least one species of Ni, Co and Mn. It may have a layered or spinel crystal structure, etc. In a preferable embodiment, the lithium transition metal oxide has a layered (typically rock-salt type) crystal structure. The art disclosed herein can be applied to a positive electrode comprising such a positive electrode active material intended for use in a lithium secondary battery, and various lithium secondary batteries (typically lithium-ion secondary batteries) comprising the positive electrode as a component.

The combined amount of Ni, Co and Mn contained in the positive electrode active material is, for instance, 85% by mole or greater (preferably 90% by mole or greater, typically 95% by mole or greater), with the total amount of metals excluding lithium that are contained in the positive electrode active material being 100% by mole. A preferable positive electrode active material comprises at least Ni. For example, a preferable positive electrode active material comprises 10% by mole or greater (more preferably 25% by mole or greater) of Ni, with the total amount of metals excluding lithium that are contained in the positive electrode active material being 100% by mole.

A preferable example of the lithium transition metal oxide in the art disclosed herein is a lithium oxide comprising at least Li, Ni, Co and Mn (i.e., a LiNiCoMn oxide). For instance, with the combined amount (based on the number of atoms) of Ni, Co and Mn being 1, can be preferably used a LiNiCoMn oxide in which the Ni, Co and Mn contents are, respectively, higher than zero, but 0.7 or lower (e.g., higher than 0.1, but 0.6 or lower; typically higher than 0.3, but 0.5 or lower). The primary element (an element contained most based on the number of atoms) among Ni, Co and Mn can be any of Ni, Co and Mn. In a preferable embodiment, the primary element is Ni. In another preferable embodiment, the amounts (based on the number of atoms) of Ni, Co and Mn are approximately the same. Such a three-element-based lithium transition metal oxide is preferable since it exhibits great thermal stability as a positive electrode active material.

<<Distributions of W and Mg>>

The positive electrode active material further comprises W and Mg besides at least one species of Ni, Co and Mn. The art disclosed herein is characterized by that the Mg is present throughout primary particles while the W is present, concentrated on surfaces of the primary particles. With W and Mg being distributed in such ways, can be obtained a lithium secondary battery having effectively-increased output power (especially, output power at a low temperature) in a low SOC range.

Herein, W being "present, concentrated on surfaces of primary particles" means that W is present (distributed) intensively on surfaces (grain boundaries) of primary particles than in interiors of primary particles. Thus, it does not to mean solely an embodiment where W is present only on grain boundaries (in other words, an embodiment where no W is present in interiors of primary particles). A concentrated presence of W on surfaces of primary particles can be confirmed, for instance, by mapping the distribution of W by energy dispersive X-ray spectroscopy (EDX) with respect to active material particles (secondary parades) and detecting an intensive presence of W on gain boundaries (a greater presence of W per unit area on grain boundaries than in interiors of primary particles) in the results of the mapping (see FIG. 5). Locations of the grain boundaries (surfaces of primary particles) can be determined, for instance, by observing the cross sections with a transmission electron microscope (TEM). A TEM equipped with EDX can be preferably used.

Mg being "present throughout primary particles" means that Mg is present (distributed) (preferably, almost evenly) all over the positive electrode active material without notable concentration. Thus, on the contrary to the distribution of W, Mg is not concentrated on primary particle surfaces. The even distribution of Mg can be confirmed, for instance, by line analysis of active material particles (secondary particles) by EDX and finding no concentrations at locations corresponding to grain boundaries. It can be confirmed also by mapping the distribution of Mg in a similar manner to the W distribution and finding no concentrations at grain boundaries (see FIG. 6). In a preferable embodiment, results of the line analysis appear approximately uniform throughout primary particles (e.g., all over active material particles).

It is noted that while the positive electrode active material comprises at least one species of Ni, Co and Mn (typically as constituent metal(s) of the lithium transition metal oxide), it is preferable that, as Mg is, these elements are present throughout primary particles (preferably in an approximately uniform manner)

The positive electrode active material can comprise one, two or more other metals in addition to the metals described above (i.e., at least one species of Ni, Co and Mn, Li, W and Mg). Such metal(s) may be one, two or more elements selected, for instance, from Al, Cr, Fe, V, Nb, Mo, Ti, Cu, Zn, Ga, In, Sn, La, Ce, Ca and Na. The distributions of the respective optional metals are not particularly limited. For example, they may be present, concentrated on surfaces of primary particles or throughout primary particles. Such optional metals may give rise to effects such as decreasing the reaction resistance and increasing the durability at a high temperature. The optional metal content (when two or more species are contained, the respective contents) can be such that each optional metal content is 1% by mole or less (typically less than 1% by mole) of the total amount of all the metals excluding Li, and it is usually preferable that each accounts for 0.1% by mole or less (typically less than 0.1% by mole). When two or more species of optional metals are contained, the total amount of these optional metals can be 2% by mole or less (typically less than 2% by mole) of the total amount of all the metals excluding Li, and it is usually preferable that they account for 0.2% by mole or less (typically less than 0.2% by mole). Alternatively, the lithium transition metal oxide may be essentially free of metals other than Li, Ni, Co, Mn, W and Mg (meaning that such optional metals are not intentionally included, but unintentional or inevitable inclusion of optional metals may be allowed).

The positive electrode active material may have a composition (referring to the mean composition of the whole positive electrode active material) represented by the following formula (I) when W and Mg are excluded:

$$Li_{1+m}Ni_pCo_qMn_rM^1_sO_2 \qquad (I)$$

In the formula (I), m may satisfy $0 \leq m \leq 0.2$ (e.g., $0.05 \leq m \leq 0.2$). In the formula, p may satisfy $0.1 < p \leq 1$ (e.g., $0.3 < p < 0.9$, preferably $0.3 < p < 0.6$); q may satisfy $0 \leq q \leq 0.5$ (e.g., $0.1 < q < 0.4$, preferably $0.3 < q < 0.6$; r may satisfy $0 \leq r \leq 0.5$ (e.g., $0.1 < r < 0.4$, preferably $0.3 < r < 0.6$), satisfying $p+q+r \leq 1$ (typically $0.81 \leq p+q+r \leq 1$, e.g., $0.9 \leq p+q+r \leq 1$). $M^1$ may be one, two or more species selected from Al, Cr, Fe, V, Ti, Mo, Cu, Zn, Ga, In, Sn, La, Ce, Ca and Na while s may satisfy $0 \leq s \leq 0.05$, or s can be essentially zero (i.e., an oxide essentially free of $M^1$).

A preferable positive electrode active material has a mean composition equivalent to the composition represented by the formula (I) further including prescribed amounts of W and Mg added thereto. The formula (I) indicates the composition of the positive electrode active material upon construction of a battery (i.e., the composition of the positive electrode active material to be used for producing the battery) excluding W and Mg. This composition is usually about the same as the composition of the battery when fully discharged.

In the art disclosed herein, the W content in the positive electrode active material can be, for instance, above zero % by mole, but 3% by mole or lower, with the combined amount of Ni, Co and Mn contained in the positive electrode active material being 100% by mole. With too low a W content, it may become difficult to obtain sufficient effects to increase battery performance relative to a positive electrode active material having a W-free composition (e.g., an effect to increase the output power in a low SOC range, an effect to reduce the reaction resistance, etc.). Also with too high a W content, it may become difficult to obtain sufficient effects to increase battery performance relative to a W-free composition, or the battery performance may turn out rather poorer. In a preferable embodiment, the W content is 0.05% by mole or higher, but 2% by mole or lower (e.g., 0.1% by mole or higher, but 1.0% by mole or lower). In the art disclosed herein, W is present, concentrated at locations (specifically, on surfaces of primary particles) suitable for exhibiting a desirable function; and therefore, it is possible to obtain sufficient effects to improve the performance with a lower W content. Thus, negative effects (tradeoffs) by use of W can be better suppressed. It is also advantageous from the standpoint of reducing risks associated with resources of battery materials. The W content can be measured, for instance, by ICP (inductively coupled plasma) emission spectrometry.

The Mg content in the positive electrode active material is preferably above 50 ppm relative to the total amount of the positive electrode active material based on the mass. In other words, it is preferable to contain Mg in an amount larger than $50/100 \cdot 10^4$ g per gram of the positive electrode active material. With too low a Mg content, it may become difficult to obtain sufficient effects to improve battery performance relative to a positive electrode active material having a Mg-free composition (e.g., an effect to increase the output power in a low SOC range). In a preferable embodiment, the Mg content is 1000 ppm or lower. With too high a Mg content, the output power may decrease in a mid SOC range (typically about 40 to 60% SOC, e.g., 56%). The effect to increase the output power in a low SOC range may tend to decline, in a preferable embodiment, the Mg content is 100 ppm or higher, but 800 ppm or lower (e.g., 300 ppm or higher, but 600 ppm or lower). The Mg content can be measured, for instance, by ICP emission spectrometry.

When practicing the art disclosed herein, it is not necessary to reveal how the use of a positive electrode active material having the constitution described above increases the output power in a low SOC range. However, for example, the following can be inferred: That is, as a means to increase the output power in a low SOC range, the depth of discharge of the positive electrode can be lowered in the low SOC range, A lower depth of discharge of the positive electrode means that, based on the battery SOC, the positive electrode active material can accept a larger amount of Li ions (has more room to accept Li ions) at a prescribed SOC. With the amount of acceptable Li ions being larger, the Li mobility (diffusivity) tends to increase in the solid positive electrode active material. Thus, by lowering the depth of discharge of the positive electrode in a low SOC range, the output power (especially, the low temperature output power, which is more likely to be affected by the Li diffusivity) in the low SOC range can be expected to increase.

In order to lower the depth of discharge of the positive electrode in a low SOC range, it is effective to increase the initial charge-discharge efficiency (or to reduce the irreversible capacity, in other words) of the positive electrode. In the positive electrode active material disclosed herein, the presence of W on surfaces (grain interfaces) of primary particles may serve to increase the initial charge-discharge efficiency, for instance, by contributing to charging and discharging of the battery through changes in its oxidation state. This W may produce an effect to reduce the reaction resistance of the positive electrode active material. The presence of Mg in primary particles may serve to increase the initial charge-discharge efficiency, by stabilizing changes in the crystal structure caused by charging and discharging. As such, it is considered that with W and Mg being distributed, respectively, at suitable locations in the positive electrode active material, the output power can be effectively improved in a low SOC range in a battery using the positive electrode active material.

<<Production Method of Positive Electrode Active Material>>

As a method for producing such a positive electrode active material, can be suitably employed a method capable of preparing the active material as a final product. With an example of a positive electrode active material wherein the lithium transition metal oxide is an oxide (LiNiCoMn oxide) containing all Ni, Co and Mn and has a layered structure, an embodiment of a preferable production method for the positive electrode active material is described in detail below although the application, of the art disclosed herein is not to be limited to such a positive electrode active material.

As shown in FIG. 1, the positive electrode active material production method according to the present embodiment comprises preparing an aqueous solution $Aq_A$ containing Ni, Co, Mn and Mg (typically an aqueous solution that is acidic, i.e., at pH below 7) (step S110). This aqueous solution $Aq_A$ is typically a composition essentially free of W. The ratio of the respective metals contained in the aqueous solution $Aq_A$ can be suitably selected in accordance with the composition of the target positive electrode active material. For example, the molar ratio among Ni, Co and Mn can be about the same as the molar ratio among these elements in the positive electrode active material. By adjusting the concentration of Mg in the aqueous solution $Aq_A$, the Mg content in the positive electrode active material can be controlled. The aqueous solution $Aq_A$ may be a single aqueous solution containing all Ni, Co, Mn and Mg, or two or more different aqueous solutions having different compositions. For example, two different species, namely an aqueous solution $Aq_{A1}$ containing solely Ni, Co and Mn as metal elements, and an aqueous solution $Aq_{A2}$ containing solely Mg as a metal element, can be used as the $Aq_A$. Usually, from the standpoint of avoiding a complex production system or enabling easily control of production conditions, etc., it is preferable to employ an embodiment using a single aqueous solution $Aq_A$ containing all Ni, Co, Mn and Mg.

<<Aqueous Solution>>

The aqueous solution $Aq_A$ can be prepared, for instance, by dissolving individually-prescribed amounts of suitable Ni compound, Co compound, Mn compound and Mg compound in an aqueous solvent. As these metal compounds, can be preferably used salts of the respective metals (i.e., a Ni salt, a Co salt, a Mn salt, and a Mg salt). The order of adding these metal salts to an aqueous solvent is not particularly limited. It can also be prepared by mixing aqueous solutions of the respective salts. Alternatively, an aqueous solution of the Mg salt can be mixed with an aqueous solution containing the Ni salt, Co salt and Mn salt. Anions in these metal salts (Ni salt, Co salt, Mn salt, Mg salt) can be selected, respectively, so that the salts have desirable water solubility. Examples include sulfate ion, nitrate ion, chloride ion, carbonate ion, hydroxide ion, and the like. In other words, the metal salts can be sulfate salts, nitrate salts, chloride salts, carbonate salts, hydroxide salts, etc., of Ni, Co, Mn and Mg, respectively. Anions in these metal salts may be entirely or partially the same, or different from each other. These salts may be solvates such as hydrates, etc., respectively. FIG. 1 shows an example using sulfate salts of the respective metals. It is preferable that the aqueous solution $Aq_A$ has concentrations such that all transition metals (Ni, Co, Mn) when combined correspond to about 1.0 mol/L to 2.2 mol/L.

<<Aqueous Solution $Aq_C$ (Aqueous W Solution)>>

The positive electrode active material production method according to the present embodiment also comprises preparing an aqueous solution $Aq_C$ containing W (or "aqueous W solution" hereinafter) (step S120). The aqueous W solution is typically a composition essentially free of Ni, Co, Mn and Mg (meaning that these metals are not included at least intentionally while allowing their inclusion as inevitable impurities, etc.). For example, can be preferably used an aqueous W solution essentially consisting of W as a metal element. The aqueous W solution can be prepared in a similar manner as the aqueous solution $Aq_A$ described above, by dissolving a prescribed amount of a W compound in an aqueous solvent. As such a W compound, for instance, various types of W salt can be used. In a preferable embodiment, a salt of tungstic acid (an oxoacid having W as the central element) is used. The cation in the W salt can be selected so that the salt turns out water-soluble, and it may be, for instance, ammonium ion, sodium ion, potassium ion, or the like. One example of W salt that can be preferably used is ammonium paratungstate $(5(NH_4)_2O \cdot 12WO_3)$ (FIG. 1). The W salt can be a solvate such as a hydrate or the like. The aqueous W solution preferably has a concentration of about 0.01 mol/L to 1 mol/L based on the W content.

For preparing the aqueous solution $Aq_A$ and the aqueous W solution, water is usually used as the aqueous solvent. Depending on the solubilities of the respective metal salt compounds to be used, water may contain a reagent (acid, base, etc.) to increase the solubilities.

<<Basic Aqueous Solution>>

The method according to the present embodiment may further comprise preparing an basic aqueous solution (step S130). This basic aqueous solution is an aqueous solution containing an alkaline agent (a compound that works to alkalize a liquid) dissolved in an aqueous solvent. As the alkaline agent, either a strong base (e.g., hydroxides of alkali metals such as sodium hydroxide, potassium hydroxide, etc) or a weak base (ammonia, amines, etc) can be used. A preferable basic aqueous solution $Aq_B$ contains at least ammonia, in a preferable embodiment of the art disclosed herein, a basic aqueous solution containing both a weak base and a strong base is used. For example, a preferable basic aqueous solution contains ammonia and sodium hydroxide. Multiple basic aqueous solutions (e.g., ammonia water and an aqueous sodium hydroxide solution) having different compositions may be used. Typically, it is a composition essentially free of Ni, Co, Mn, Mg and W (indicating that these metals are not added at least intentionally while allowing their inevitable inclusion as impurities, etc).

<<Crystallization of Precursor Hydroxide>>

The aqueous solution $Aq_A$ and the aqueous W solution are mixed under a basic condition (preferably at pH 11 to 14) to precipitate (crystallize) a precursor hydroxide containing Ni, Co, Mn, Mg and W (step S140). Therefore, the aqueous solution $Aq_A$ is neutralized and then mixed with W. For example, a basic aqueous solution having an initial pH of 11 to 14 (typically 11.5 to 12.5, e.g., around 12.0) is provided in a reaction vessel (step S142), and while maintaining the initial pH, the aqueous solution $Aq_A$ and the aqueous W solution $Aq_C$ are supplied to the reaction vessel at suitable rates and mixed with stirring. For this, in order to maintain the initial pH, a basic aqueous solution can be additionally supplied to the reaction vessel (step S144) as needed. The precipitated precursor hydroxide is washed with water and filtered after completion of precipitation, allowed to dry, and prepared into particles having a desirable particle diameter (step S150).

As such, by preparing separate aqueous solutions to contain Ni, Co, Mn and Mg, and to contain W and mixing these under a basic condition (typically, under a condition at pH 11 or above), can be produced a precursor hydroxide (typically as particles) suitable for producing a positive electrode active material in which Mg is present throughout primary particles while W is present, concentrated on surfaces of the primary particles. It is considered that by neutralizing the aqueous solution $Aq_A$ containing Ni, Co, Mn and Mg and mixing with W afterwards, a hydroxide containing Ni, Co, Mn and Mg starts to precipitate out; and precipitation of W is facilitated by contacts with the precipitate.

While the reaction to precipitate the precursor hydroxide (reaction to produce the hydroxide) is carried out, it is preferable to control the temperature of the reaction mixture to be in a range of 20° C. to 60° C. (e.g., 30° C. to 50° C.). It is also preferable to adjust the pH of the reaction mixture to 11 to 14 (typically 11.5 to 12.5, e.g., around 12.0). In an embodiment using a basic aqueous solution containing ammonia, the concentration of ammonia in the reaction mixture is preferably adjusted to 3 g/L to 25 g/L. The time over which the reaction to precipitate the precursor hydroxide is continued can be suitably selected in accordance with the target particle diameters (typically the average particle diameter) of the positive electrode active material. As a tendency, to obtain a positive electrode active material having larger particle diameters, the suitable reaction time would be longer.

The positive electrode active material production method according to the present embodiment may comprise mixing the precursor hydroxide and a Li compound (step S160). As the Li compound, an oxide containing Li may be used, or a compound capable of forming an oxide when heated (carbonate, nitrate, sulfate, oxalate, hydroxide, ammonium salt, sodium salt, etc., of Li) may be used as well. Examples of preferable Li compounds include lithium carbonate, lithium hydroxide, and the like. Among such Li compounds, can be used one species solely, or a combination of two or more species. Mixing the precursor hydroxide and the lithium compound can be carried out in an embodiment of either wet mixing or dry mixing. From the standpoint of the convenience and the cost-effectiveness, dry mixing is preferable. The mixture ratio of the Li compound to the precursor hydroxide can be selected so that the molar ratio among Li to Ni, Co and Mn in the target positive electrode active material is obtained. For example, the precursor hydroxide and the Li compound may be mixed so that the molar ratio of Li to Ni, Co and Mn is about the same as their molar ratio in the positive electrode active material.

The mixture is then calcined to produce a lithium transition metal oxide (step S170). It is preferable that the calcination temperature is in a range of about 700° C. to 1000° C. Calcination can be carried out once at a constant temperature, or carried out stepwise at different temperatures. The time for calcination can be suitably selected. For instance, calcination can be carried out at around 800° C. to 1000° C. for about 2 to 24 hours. Alternatively, it can be subjected to calcination at around 700° C. to 800° C. for about 1 to 12 hours followed by calcination at around 800° C. to 1000° C. for about 2 to 24 hours, in order to obtain higher output power, the calcination temperature is preferably in a range of 850° C. to 980° C. (e.g., 850° C. to 950° C.). Such calcination conditions can be preferably employed in producing a positive electrode active material to be used in a lithium secondary battery intended for applications where higher output performance is considered important, such as hybrid automobiles. In order to broaden the SOC range capable of producing desirable output power, the calcination temperature is preferably in a range of 900° C. to 1000° C. Such calcination conditions can be preferably employed in producing a positive electrode active material to be used in a lithium secondary battery intended for applications where larger available current is considered important, such as electric automobiles.

Preferably, the calcined product is crushed oiler the calcination process, and sifted as necessary to adjust the particle diameter of the positive electrode active material. In such a way, it is possible to obtain a positive electrode active material in a form of secondary particles as aggregates of primary particles of a lithium transition metal oxide, wherein Mg is present throughout the primary particles while W is present, concentrated on surfaces of the primary particles.

The positive electrode active material in the art disclosed herein may have an average particle diameter of secondary particles of about 1 μm to 50 μm. In a preferable positive electrode active material, the average particle diameter is about 2 μm to 20 μm (typically 3 μm to 10 μm, e.g., about 3 μm to 7 μm). In the present description, the term "average diameter" refers to a median diameter (50th volume percentile average particle diameter; or indicated as "D50" hereinafter) determined from a size distribution measured using a particle counter based on the laser scattering/difftactometry unless otherwise specified. The positive electrode active material preferably has a specific surface area in a range of about 0.5 $m^2/g$ to 1.8 $m^2/g$.

The average particle diameter of the primary particles constituting the positive electrode active material can be determined by measuring the diameter in a certain direction (the largest diameter) with respect to at least five (e.g., about five to ten) primary particles, using an electron microscope (either a transmission-type (TEM) or a scanning-type (SEM) can be used), and arithmetically averaging the results. Usually, in a preferable positive electrode active material, the primary particles have an average particle diameter of 0.1 μm to 1.0 μm (e.g., 0.2 μm to 0.7 μm).

The present invention also provides an positive electrode comprising a positive electrode active material disclosed herein. It also provides a lithium-ion secondary battery comprising the positive electrode. An embodiment of such a lithium-ion secondary battery is described in detail with an example of a lithium-ion secondary battery having a constitution where a wound electrode body and a non-aqueous electrolyte solution are placed in a flattened square battery case although the art disclosed herein is not to be limited to such an embodiment.

<<Lithium-Ion Secondary Battery>>

Figure 2:
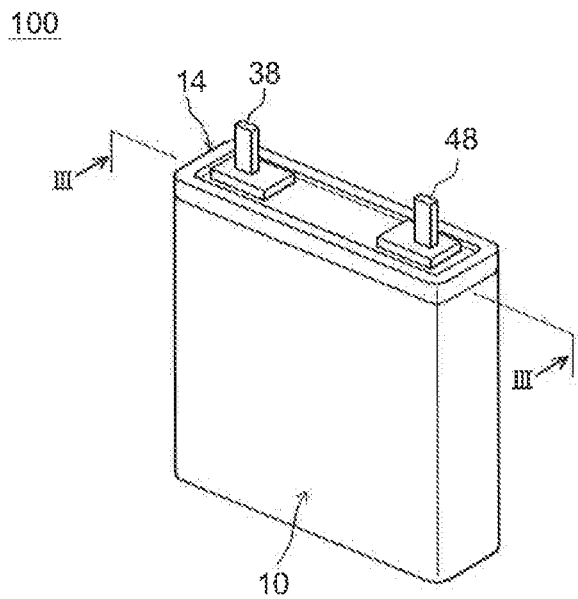
FIG. 2 shows a perspective view schematically illustrating a constitution of a lithium secondary battery.
Figure 3:
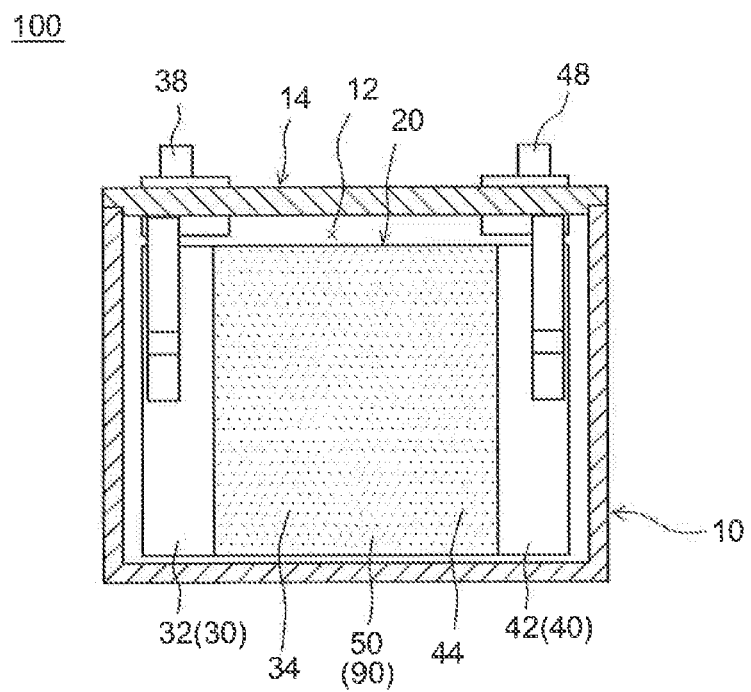
FIG. 3 shows a cross-sectional view taken along line III-III in FIG. 2.

As shown in FIG. 2 and FIG. 3, a lithium-ion secondary battery according to an embodiment of the art disclosed herein has a constitution where a wound electrode body 20 is placed along with a non-aqueous electrolyte solution 90 in a flattened box-shape battery case 10 corresponding to the shape of the electrode body 20. Case 10 has an opening 12 closed with a lid 14. Lid 14 has a positive terminal 38 and a negative terminal 48 for connection to the outside, with the terminals partially extending out of lid 14. The lithium-ion secondary battery 100 having such a constitution can be constructed, for instance, by placing wound electrode body 20 via opening 12 into case 10, attaching lid 14 onto opening 12 of the case 10, then injecting electrolyte solution 90 via an electrolyte injection hole (not shown in the drawing) provided in lid 14, and subsequently covering the injection hole.

Electrode body 20 is formed into a flattened shape by overlaying and winding up a positive electrode sheet 30 where a positive electrode, material layer 34 containing a positive electrode active material is retained on a long sheet of a positive current collector 32 and a negative electrode sheet 40 where a negative electrode material layer 44 is retained on a long sheet of a negative current collector 42, and laterally compressing the resulting wound body. In typical, between positive electrode material layer 34 and negative electrode material layer 44, an insulating layer is placed to prevent direct contacts between the two. In a preferable embodiment, as the insulating layer, two long sheets of a separator 50 are used. For example, these separators 50 are wound along with positive electrode sheet 30 and negative electrode sheet 40 to construct electrode body 20. The insulating layer may coat one or each of positive electrode material layer 34 and negative electrode material layer 44.

Positive electrode sheet 30 is formed to expose positive current collector 32 on an edge along the length direction where no positive electrode material layer 34 is present. Similarly, negative electrode sheet 40 is thrilled to expose negative current collector 42 on an edge along the sheet length direction where no negative electrode material layer 44 is present. Positive terminal 38 and negative teem 48 are joined to the exposed edges of positive current collector 32 and negative current collector 42, respectively. Positive and negative terminals 38 and 48 can be joined to positive and negative current collectors 32 and 42, for example, by ultrasonic welding, resistance welding, and so on.

Positive electrode sheet 30 can be preferably fabricated, for instance, by applying to positive current collector 32 a paste or slurry composition (positive electrode material composition) obtained by dispersing in a suitable solvent a positive electrode active material disclosed herein along with a conductive material, a binder, etc., used as necessary, and by allowing the composition to dry. As the solvent, either an aqueous solvents or an organic solvent can be used. From the standpoint of more highly preventing an event where W contained in the positive electrode active material is dissolved into the solvent, it is preferable to use an organic solvent (e.g., N-methyl-2-pyrrolidone (NMP)) as the solvent.

As the conductive material, can be preferably used a powdered conductive material such as carbon powder, carbon fibers, and so on. As the carbon powder, various types of carbon black such as acetylene black, furnace black, Ketjen black, graphite powder and the like are preferable. For the conductive material, one species can be used solely, or two or more species can be used in combination.

Examples of the binder include carboxymethyl cellulose (CMC; typically as sodium salt), polyvinyl alcohol (PVA), polytetrafluoroethylene (PTFE), styrene-butadiene rubber (SBR), polyvinylidene fluoride (PVDF), and the like. Among these binders, can be used one species solely, or two or more species in combination. Such a binder may serve as a thickening agent in the positive electrode material composition.

The ratio of the positive electrode active material contained in the entire positive electrode material layer is suitably about 50% by mass or higher (typically 50 to 95% by mass), or it is usually preferable to be about 70 to 95% by mass. When a conductive material is used, the ratio of the conductive material contained in the entire positive electrode material layer can be, for instance, about 2 to 20% by mass, or it is usually preferable to be about 2 to 15% by mass. When a binder is used, the ratio of the hinder contained in the entire positive electrode material layer can be, for instance, about 0.5 to 10% by mass, or it is usually suitable to be about 1 to 5% by mass.

As positive current collector 32, can be preferably used a conductive material formed of a metal having good conductivity. For example, aluminum or an alloy containing aluminum as the primary component can be used. The shape of positive current collector 32 is not particularly limited as it may vary in accordance with the shape, etc., of the lithium-ion secondary battery, and it may have a variety of shapes such as a rod, plate, sheet, foil, mesh, and so on. In an lithium-ion secondary battery 100 comprising a wound electrode body 20 as in the present embodiment, an aluminum sheet (aluminum foil) having a thickness of about 10 μm to 30 μm can be preferably used as positive current collector 32.

The positive electrode material composition applied to positive current collector 32 can be dried with heating as necessary. After dried, it may be entirely pressed as necessary. The mass (in a constitution where each face of positive current collector 32 has a positive electrode material layer 34, the combined mass) of positive electrode material layer 34 formed per unit surface area of positive current collector 32 is suitably, for instance, about 5 mg/cm$^2$ to 40 mg/cm$^2$ (typically 5 mg/cm$^2$ to 20 mg/cm$^2$). Positive electrode material layer 34 may have a density of, for instance, about 1.0 g/cm$^3$ to 3.0 g/cm$^3$ (typically 1.5 g/cm$^3$ to 3.0 g/cm$^3$).

Negative electrode sheet 40 can be preferably fabricated, for instance, by applying to negative, current collector 42 a paste or slurry composition (negative electrode material composition) obtained by dispersing in a suitable solvent a negative electrode active material along with a binder, etc., used as necessary, and by allowing the composition dry.

As the negative electrode active material, one, two or more species of material conventionally used in lithium-ion secondary batteries can be used without particular limitations. Preferable negative electrode active materials include carbon materials. A preferable carbon material (carbon particles) is present as particles having at least partly comprising a graphite structure (layered structure). Any carbon material among so-called graphitic substances (graphite), hard-to-graphitize carbonaceous substances (hard carbons), easy-to-graphitize carbonaceous substances (soft carbons) and substances having a structure combining these can be preferably used. Among these, in particular, can be preferably used graphite particles such as natural graphite and the like. Carbon particles, etc., comprising non-crystalline (amorphous) carbon on graphite surfaces can be used as well. While the ratio of the negative electrode active material contained in the entire negative electrode material layer is not particularly limited, it is usually suitable to be about 50% by mass or higher, or preferably about 90 to 99 by mass (e.g., about 95 to 99% by mass).

As the binder, among the same binders listed for the positive electrode above, can be used one species solely, or two or more species in combination. The amount of the binder to be added can be suitably selected in accordance with the type and amount of the negative electrode active material, it can be, for instance, about 1 to 5% by mass of the entire negative electrode material layer.

As negative current collector 42, can be preferably used a conductive material formed of a metal having good conductivity. For instance, copper or an alloy containing copper as the primary component can be used. Similarly to positive current collector 32, the negative current collector 42 may take a variety of shapes. In a lithium-ion secondary battery 100 comprising a wound electrode body 20 as in the present embodiment, a copper sheet (copper foil) having a thickness of about 5 μm to 30 μm can be preferably used.

The negative electrode material composition applied to negative current collector 42 can be dried with heating as necessary. After dried, it may be entirely pressed as necessary. The mass (the combined mass of both faces) of negative electrode material layer 44 formed per unit surface area of negative current collector 42 is suitably, for instance, about 3 mg/cm$^2$ to 30 mg/cm$^2$ (typically 3 mg/cm$^2$ to 15 mg/cm$^2$). Negative electrode material layer 44 may have a density off, for instance, about 0.8 g/cm$^3$ to 2.0 g/cm$^3$ (typically 1.0 g/cm$^3$ to 2.0 g/cm$^3$).

As separator 50 placed between positive electrode sheet 30 and negative electrode sheet 40, can be used a separator similar to those generally used in the pertaining field without particular limitations. For example, can be used a porous sheet or non-woven fabric, etc., formed from a resin such as polyethylene (PE), polypropylene (PP), polyester, cellulose, polyamide, or the like.

Preferable examples include a single-layer or a multi-layer porous sheet (micro-porous resin sheet) primarily comprising one, two or more species of polyolefin resin. For example, can be preferably used a PE sheet, a PP sheet, a tri-layer (PP/PE/PP) sheet in which a PP layer is overlaid on each face of a PE layer, or the like. The thickness of the separator is preferably selected from a range of, for instance, about 10 μm to 40 μm. The separator in the art disclosed herein may have a constitution comprising a porous heat-resistant layer on one or each (typically one) face of the porous sheet or nonwoven fabric, etc. Such a porous heat-resistant layer may contain, for instance, an inorganic material. Inorganic fillers such as alumina particles, etc., can be preferably used.

As non-aqueous electrolyte solution 90, a solution containing an electrolyte (supporting salt) in a non-aqueous solvent (organic solvent) is used. As the non-aqueous solvent, one, two or more species can be suitably selected and used among organic solvents used in electrolyte solutions of general lithium-ion secondary batteries. Examples of especially preferable non-aqueous solvents include carbonates such as ethylene carbonate (EC), diethyl carbonate (DEC), dimethyl carbonate (DMC), ethyl methyl carbonate (EMC), vinylene carbonate (VC), propylene carbonate (PC), and so on. For example, a mixed solvent containing EC, EMC and DMC at a volume ratio of 3:3:4 can be preferably used.

As the electrolyte, one, two or more species can be suitably selected and used among lithium salts used as electrolytes in general lithium-ion secondary batteries. Examples of such a lithium salt include $LiPF_6$, $LiBF_4$, $LiClO_4$, $LiAsF_6$, $Li(CF_3SO_2)_2N$, $LiCF_3SO_3$, and the like. $LiPF_6$ can be given as an especially preferable example. It is preferable to prepare non-aqueous electrolyte solution 90 to have an electrolyte concentration within a range of, fix instance, 0.7 mol/L to 1.3 mol/L (typically 1.0 mol/L to 1.2 mol/L).

Non-aqueous electrolyte solution 90 may contain optional additives as necessary, as far as the objectives of the present invention are not greatly impaired. Such additives may be used for one, two or more objectives, such as to improve the output performance, to improve the storability (to suppress a decrease in the capacity during storage, and so on), to improve the cycle properties, to improve the initial charge-discharge efficiency, etc., of battery 100. Examples of preferable additives include fluorophosphates (preferably, difluorophophates, e.g., lithium difluorophosphate represented by $LiPO_2F_2$), lithium bis(oxalate)borate (LiBOB), and the like. Usually, the concentrations of the respective additives in non-aqueous electrolyte solution 90 are suitably 0.20 mol/L, or lower (typically 0.005 mol/L to 0.20 mol/L), for instance, 0.10 mol/L, or lower (typically 0.01 mol/L, to 0.10 mol/L). As a preferable embodiment, can be cited a non-aqueous electrolyte solution 90 containing each of $LiPO_2F_2$ and LiBOB at a concentration of 0.01 mol/L to 0.05 mol/L (e.g., each at 0.025 mol/L).

Several worked examples relevant to the present invention are described below although the present invention is not to be limited to these specific examples.

<<Preparation of Positive Electrode Active Material Sample>>

(Sample 1)

To a reaction vessel equipped with a stirring device and a nitrogen inlet, water was added to about half the volume and heated to 40° C. while stirred. After the reaction vessel was purged with nitrogen, under a nitrogen flow, while the space inside the reaction vessel was maintained to have a non-oxidative atmosphere having an oxygen concentration of about 2.0%, suitable amounts of a 25% (by mass) aqueous sodium hydroxide solution and a 25% (by mass) ammonia water were added, respectively to prepare a basic aqueous solution (aqueous $NH_3 \cdot NaOH$ solution) having a pH of 12.0 based on a liquid temperature of 25° C. and having a liquid-phase ammonia concentration of 15 g/L.

Nickel sulfate ($NiSO_4$), cobalt sulfate ($CoSO_4$) and manganese sulfate ($MnSO_4$) were dissolved in water so that these metals had a molar ratio (Ni:Co:Mn) of 0.33:0.33:0.33 while the total concentration of these metals combined was 1.8 mol/L. To this aqueous solution, magnesium sulfate ($MgSO_4$) was further mixed in to prepare an aqueous solution $Aq_A$ having a Mg concentration of 20 mg/l, in the mixture solution.

Ammonium paratungstate ($5(NH_4)_2O \cdot 12WO_3$) was dissolved in water to prepare an aqueous solution $Aq_C$ (aqueous W solution) having a tungsten (W) concentration of 0.05 mol/L.

To the basic aqueous solution in the reaction vessel, the resulting aqueous solution $Aq_A$, aqueous solution $Aq_C$, 25% aqueous sodium hydroxide solution and 25% ammonia water were added and mixed so that the of the reaction mixture was maintained at 12.0 while the ammonia concentration of the liquid phase was maintained at 15 g/L. The pH and the ammonia concentration were adjusted by controlling the rates of supplying the respective solutions to the reaction vessel.

The precipitated product was washed with water and allowed to dry to obtain a precursor hydroxide having a Ni:Co:Mn:W molar ratio of 0.33:0.33:0.33:0.005 and further containing Mg. The mean composition of this hydroxide (hydroxide particles) can be represented by $Ni_{0.33}Co_{0.33}Mn_{0.33}W_{0.005}(OH)_{2+\alpha}$ (Note: Mg is further contained; it also meets $0 \leq \alpha \leq 0.5$). The hydroxide was stored in an air atmosphere at a temperature of 150° C. for 12 hours.

Subsequently, with $M_T$ being the combined number of moles of Ni, Co and Mn contained in the hydroxide, lithium carbonate was weighed out to yield a lithium to $M_T$ molar ratio ($Li/M_T$) value of 1.15, and mixed with the hydroxide. The resulting mixture was calcined at 850° C. to 950° C. for 10 hours in air having an oxygen ($O_2$) concentration of 21% by volume. The calcined product was crushed and sifted to obtain a positive electrode active material sample 1 having a mean composition represented by $Li_{1.15}Ni_{0.33}Co_{0.33}Mn_{0.33}W_{0.005}O_2$ (while further containing Mg at 110 ppm relative to the total amount of the positive electrode active material). The Mg content was measured by ICP emission spectrometry.

(Samples 2~10)

The Mg concentration in the aqueous solution $Aq_A$ and the W concentration in the aqueous W solution were adjusted so that the Mg content and the W content turned out to be the values shown in Table 1, respectively. Otherwise in the same manner as the positive electrode active material sample 1, positive electrode active material samples 2 to 10 were prepared.

Each of these positive electrode active material samples 1 to 10 was adjusted to have an average particle diameter (D50) in a range of 3 μm to 8 μm and a specific surface area in a range of 0.5 $m^2$/g to 1.9 $m^2$/g.

<<TEM Analysis>>

Figure 4:
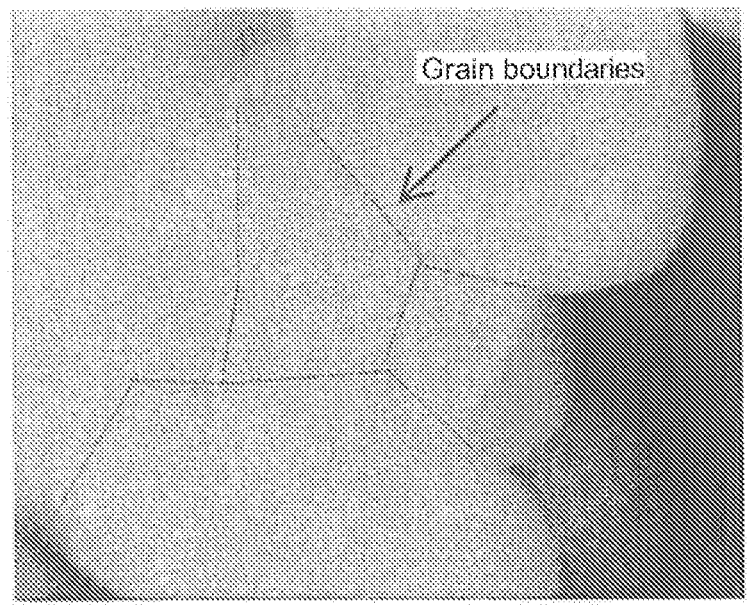
FIG. 4 shows a TEM image of the positive electrode active material according to an embodiment.

Positive electrode active material sample 1 obtained above was observed by TEM and it was found to be in a form of secondary particles as aggregates of multiple primary particles. From the TEM images, the average particle diameter of the primary particles was found to be about 0.5 μm. The average particle diameter of the primary particles was determined by measuring the diameter in a certain direction (the longest diameter) with respect to about 10 primary particles and arithmetically averaging the results. FIG. 4 shows a TEM image of Sample 1. The TEM image was obtained at an accelerating voltage of 200 kV, using a transmission electron microscope under model number "JEM-2100F" available from JEOL, Ltd. The black lines in the image had been added to make the image more visible, indicating the locations of gain boundaries (interfaces between primary particles). Similarly, it was confirmed that Samples 2 to 10 were in forms of secondary particles as aggregates of several primary particles.

<<Distributions of W and Mg>>

Figure 5:
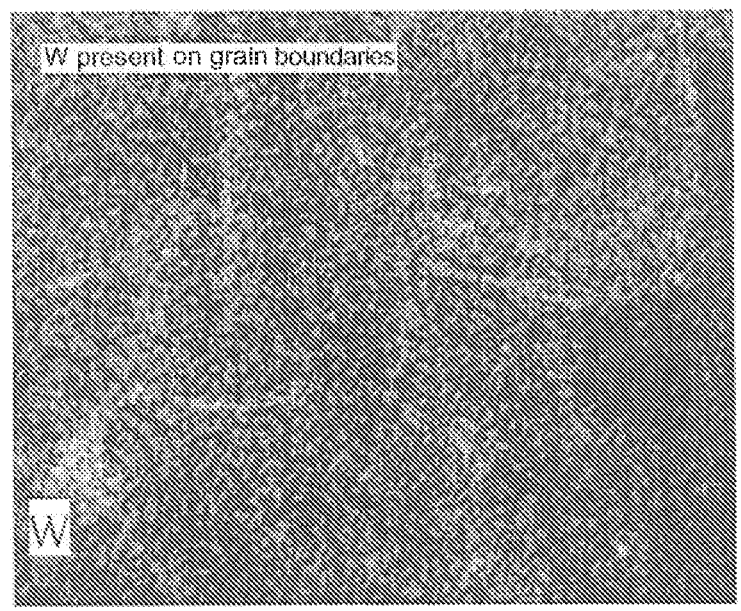
FIG. 5 shows an image illustrating distribution of W in the positive electrode active material shown in FIG. 4.

Positive electrode active material sample 1 was subjected to EDX analysis in the same viewing field as FIG. 4 to map the distribution of W. The results are shown in FIG. 5. In FIG. 5, locations with more detected W appear brighter. As evident from comparison of the bright locations in FIG. 5 and the locations of grain boundaries shown in FIG. 4, the presence of W was concentrated on the grain boundaries in Sample 1. Samples 2 to 10 were also subjected to mapping of W distribution, and each sample was found to have a concentrated presence of W on rain boundaries although the brightness varied depending on the W content.

Figure 6:
FIG. 6 shows an image illustrating distribution of Mg in the positive electrode active material shown in FIG. 4.

Positive electrode active material sample 1 was subjected to EDX analysis in the same viewing field as FIG. 4 to map the distribution of Mg as well. The results are shown in FIG. 6. Locations with more detected Mg appear brighter. As evident from comparison of FIG. 6 and FIG. 4, it was found that the presence of Mg was almost uniform (no concentration of brightness observed) in Sample 1. Samples 2 to 10 were also subjected to mapping of Mg distribution, and each sample was found to have an evenly distributed presence of Mg although the brightness varied depending on the Mg content.

<<Fabrication of Test Battery>>

Using each of the positive electrode active material samples 1 to 10, was fabricated a lithium-ion secondary battery (test battery) 100 having a constitution outlined in FIGS. 2 and 3. The batteries may be referred to as batteries 1 to 10 below, corresponding to positive electrode active material samples 1 to 10 used.

The positive electrode active material sample, acetylene black (AB) as a conductive material and PVDF as a binder were mixed with NMP so that they had a mass ratio of 90:8:2, and a slurry composition was prepared. The composition was applied to each face of 15 μm thick aluminum foil (positive, current collector) 32 so that after dried, the two faces had a combined mass (basis weight) of 11.8 mg/$cm^2$. After dried, it was pressed with a roller pressing machine to adjust the density of positive electrode material layer 34 to 2.3 g/$cm^2$. A positive electrode sheet 30 was thus fabricated.

As the negative electrode active material, was used a particulate carbon having a constitution where a graphite particle surface is coated with amorphous carbon. More specifically, natural graphite power was mixed with pitch so that pitch was deposited on surfaces of the graphite powder (the mass ratio of a natural graphite powder to pitch was 96:4), and the resultant was calcined at 1000° C. to 1300° C. for 10 hours in an inert gas atmosphere. The product was sifted to obtain a negative electrode active material having an average particle diameter (D50) of 8 μm to 11 μm and a specific surface area of 3.5 m$^2$/g to 5.5 m$^2$/g. The negative electrode active material, CMC and SBR were mixed with ion-exchanged water so that their mass ratio was 98.6:0.7:0.7, and a slurry composition was prepared. The composition was applied to each face of 10 μm thick copper foil (negative current collector) 42 so that after dried, the two faces had a combined mass (basis weight) of 7.5 mg/cm$^2$. After dried, it was pressed with a roller pressing machine to adjust the density of negative electrode material layer 44 to 1.0 g/cm$^3$ to 1.4 g/cm$^3$. A negative electrode sheet 40 was thus fabricated.

Positive electrode sheet 30 and negative electrode sheet 40 were wound along with two porous polyethylene sheets 50 (20 μm thick) and flattened to fabricate an electrode body 20. A positive terminal 38 and a negative terminal 48 were attached to a lid 14, and these terminals 38 and 48 were welded to positive current collector 32 and negative current collector 42 exposed at edges of electrode body 20, respectively. Electrode body 20 joined to lid 14 in such a way was placed via an opening 12 into a case 10, and lid 14 was laser-welded to opening 12 of the case 10.

A non-aqueous electrolyte solution 90 was injected through an electrolyte injection hole (not shown in the drawing) provided in lid 14. The non-aqueous electrolyte solution 90 used contained 1.1 mol/L (1.1 M) of LiPF$_6$ as a supporting salt in a mixed solvent formed of EC, EMC and DMC at a volume ratio of 3:3:4. Subsequently, the injection hole was covered to construct a lithium-ion secondary battery 100 for testing. The battery 100 was adjusted to have a counter capacity ratio value of 1.5 to 1.9, with the value being computed from the charge capacity of the positive electrode and the charge capacity of the negative electrode. Battery 100 had a capacity of about 4 Ah.

The conditioning process and rated capacity measurement to which a test battery constructed as described above is subjected are described below.

<<Conditioning>>

The conditioning process was carried out according to the following Procedures 1 to 2.

[Procedure 1] The battery is charged at a constant current of 1 C (CC-charged) until it reached a voltage of 4.1 V across the terminals, and followed with a 5 minute break. 1 C means a current value that allows a fully-charged battery to discharge to its discharge end voltage in one hour, which may be referred to as a discharge time rate.

[Procedure 2] After Procedure 1, it is charged at the constant voltage (CV-charged) for 1.5 hours and followed with a 5 minute break.

<<Measurement of Rated Capacity>>

With respect to each test battery after the conditioning process, at a temperature of 25° C., the rated capacity of the test battery was measured according to the following Procedures 1 to 3 over a voltage range of 3.0 V to 4.1 V.

[Procedure 1] After CC-discharged at 1 C to 3.0 V, the battery is CV-discharged fir two hours and followed with a 10 second break.

[Procedure 2] After CC-charged at 1 C to 4.1 V the battery is CV-charged for 2.5 hours and followed with a 10 second break.

[Procedure 3] After CC-discharged at 0.5 C to 3.0 V, the battery is CV-discharged for 2 hours and Shut off for 10 seconds.

In the procedure 3, the rated capacity is defined as the discharge capacity (CCCV discharge capacity) during the discharge procedure starting from the CC-discharge through the CV-discharge.

<<Measurement of Output Power at a low SOC, 0° C.>>

According to Procedures 1 to 5 below, the output power of each test battery adjusted to have a low SOC was measured at 0° C.

[Procedure 1; SOC adjustment] In an environment at ambient temperature (25° C. here), each battery after the conditioning process and rated capacity measurement was charged (CC-charged) at a constant current of 1 C from 3 V up to 27% SOC, and then charged (CV-charged) at the constant voltage for 2.5 hours.

[Procedure 2; storage at 0° C.] The battery after Procedure 1 was stored in a temperature-controlled bath at 0° C. for 6 hours.

[Procedure 3; discharge at a constant wattage] The battery after Procedure 2 is discharged at a constant wattage (W) in an environment at a temperature of 0° C., the time taken from the start of discharge until the voltage reaches 2.0 V (discharge cutoff voltage) is measured in seconds.

[Procedure 4; repeats] At discharge output power values varied between 350 W and 600 W in the constant-wattage discharge (discharge power during the constant-wattage discharge) in Procedure 3, the procedures 1 to 3 are repeated. More specifically, while the discharge output power in the constant-wattage discharge in Procedure 3 is increased by an increment of 10 W, such as 350 W for the first cycle, 360 W for the second cycle, 370 W for the third cycle . . . , the procedures 1 to 3 are repeated until the wattage reached 600 W.

[Procedure 5; determination of output power value] With the time in seconds measured up to a voltage of 2.0 V during each constant-wattage discharge in Procedure 4 being plotted on the horizontal axis and the constant-wattage output power recorded during this procedure being plotted on the vertical axis, from an approximated curve of the resulting plot, the output power value (low-SOC·0° C. output power) at which it takes 2 seconds to reach a voltage of 2.0 V is determined.

It is noted that here, although Procedures 1 to 3 were repeated in Procedure 4 while the constant-wattage discharge output power was increased by an increment of 10 W starting from 350 W up to 600 W, the conditions for the low-SOC·0° C. output power measurement is not limited to this. For instance, the constant wattage discharge output power may be increased from 350 W by a constant wattage different from the value above (e.g., by 5 V or 15 W), or the constant-wattage discharge output power can be decreased from 600 W by a constant wattage (e.g., by 5 W, 10 W, or 15 W.

The low-SOC·0° C. output power indicates the output power that the test battery can produce when it is left with a low SOC in an environment at a temperature as low as 0° C. for a prescribed time period. A higher output power value (wattage) for this indicates that the test battery can produce high output power under such usage conditions.

<<Measurement of Output Power at a Low SOC, −30° C.>>

According to Procedures 1 to 5 below, the output power of each test battery adjusted to have a low SOC was measured at −30° C.

[Procedure 1; SOC adjustment] In an environment at ambient temperature (25° C. here), each battery after the conditioning process and rated capacity measurement was charged (CC-charged) at a constant current of 1 C from 3 V up to 27% SOC, and then charged (CV-charged) at the constant voltage for 2.5 hours.

[Procedure 2; storage at −30° C.] The battery after Procedure 1 was stored in a temperature-controlled bath at −30° C. for 6 hours.

[Procedure 3; discharge at a constant wattage] The battery after Procedure 2 is discharged at a constant wattage (W) in an environment at a temperature of −30° C., the time taken from the start of discharge until the voltage reaches 2.0 V (discharge cutoff voltage) is measured in seconds.

[Procedure 4; repeating] At discharge output power values varied between 80 W and 200 W in the constant-wattage discharge (discharge power during the constant-wattage discharge) in Procedure 3, the procedures 1 to 3 are repeated. More specifically, while the discharge output power in the constant-wattage discharge in Procedure 3 is increased by an increment of 10 W, such as 80 W for the first cycle, 90 W for the second cycle, 100 W for the third cycle . . . , the procedures 1 to 3 are repeated until the wattage reaches 200 W.

[Procedure 5; determination of output power value] With the time in seconds measured up to a voltage of 2.0 V during each constant-wattage discharge in Procedure 4 being plotted on the horizontal axis and the constant-wattage output power recorded during this procedure being plotted on the vertical axis, from an approximated curve of the resulting plot, the output power value (low-SOC·−30° C. output power) at which it takes 2 seconds to reach a voltage of 2.0 V is determined.

It is noted that here, although Procedures 1 to 3 were repeated in Procedure 4 while the constant-wattage discharge output power was increased by an increment of 10 W starting from 80 W up to 200 W, the conditions for the low-SOC·−30° C. output power measurement is not limited to this. For instance, the constant-wattage discharge output power may be increased from 80 W by a constant wattage different from the value above (e.g., by 5 W, or 15 W), or the constant-wattage discharge output power can be decreased from 200 W by a constant wattage (e.g., by 5 W, 10 W, or 15 W).

The low-SOC·−30° C. output power indicates the output power that the test battery can produce when it is left with a low SOC in an environment at a temperature as extremely low as −30° C. for a prescribed time period. A higher output power value (wattage) for this indicates that the test battery can produce high output power under such severe usage conditions.

<<Measurement of Output Power at Mid SOC, −30° C.>>

According to Procedures 1 to 5 below, the output power of each test battery adjusted to have a mid SOC was measured at −30° C.

[Procedure 1; SOC adjustment] In an environment at ambient temperature (25° C. here), each battery after the conditioning process and rated capacity measurement was charged (CC-charged) at a constant current of 1 C from 3 V to 56% SOC, and then charged (CV-charged) at the constant voltage for 2.5 hours,

[Procedure 2; storage at −30° C.] The battery after Procedure 1 was stored in a temperature-controlled bath at −30° C. for 6 hours.

[Procedure 3; discharge at a constant wattage] The battery after Procedure 2 is discharged at a constant wattage (W) in an environment at a temperature of −30° C., the time taken from the start of discharge until the voltage reaches 2.0 V (discharge cutoff voltage) is measured in seconds.

[Procedure 4; repeating] At discharge output power values varied between 100 W and 250 W in the constant-wattage discharge (discharge power during the constant-wattage discharge) in Procedure 3, the procedures 1 to 3 are repeated. More specifically while the discharge output power in the constant-wattage discharge in Procedure 3 is increased by an increment of 20 W, such as 100 W for the first cycle, 120 W for the second cycle, 140 W for the third cycle . . . , the procedures 1 to 3 are repeated until the wattage reaches 250 W.

[Procedure 5; determination of output power value] With the time in seconds measured up to a voltage of 2.0 V during each constant-wattage discharge in Procedure 4 being plotted on the horizontal axis and the constant-wattage output power recorded during this procedure being plotted on the vertical axis, from an approximated curve of the resulting plot, the output power value (mid-SOC·−30° C. output power) at which it takes 2 seconds to reach a voltage of 2.0 V is determined.

It is noted that here, although Procedures 1 to 3 were repeated in Procedure 4 while the constant-wattage discharge output power was increased by an increment of 20 W starting from 100 W up to 250 W the conditions for the mid-SOC·−30° C. output power measurement is not limited to this. For instance, the constant-wattage discharge output power may be increased from 100 W by a constant wattage different from the value above (e.g., by 5 W 10 W or 15 W), or the constant-wattage discharge output power can be decreased from 250 W by a constant wattage (e.g., by 5 W, 10 W, 15 W, or 20 W).

The mid-SOC·−30° C. output power indicates the output power that the test battery can produce when it is left with a mid-range SOC (a SOC range where a battery is frequently used) in an environment at a temperature as extremely low as −30° C. for a prescribed time period. A higher output power value (wattage) for this indicates that the test battery can produce high output power under such usage conditions.

Table 1 shows the values of low-SOC·0° C. output power, low-SOC·−30° C. output power and mid-SOC·−30° C. output power measured above along with the W content and Mg content in the positive electrode active material used for fabrication of each test battery.

TABLE 1

| Ex. | W content (% by mole) | Mg content (ppm) | Low-SOC (27%)·0° C. output (W) | Low-SOC (27%)·30° C. output (W) | Mid-SOC (56%)·30° C. output (W) |
| --- | --- | --- | --- | --- | --- |
| 1 | 0.5 | 110 | 510 | 151 | 208 |
| 2 | 0.5 | 350 | 515 | 156 | 212 |
| 3 | 0.5 | 720 | 512 | 154 | 210 |
| 4 | 0.1 | 550 | 512 | 153 | 212 |
| 5 | 0.2 | 410 | 513 | 152 | 210 |
| 6 | 0.6 | 380 | 515 | 155 | 211 |
| 7 | 0.8 | 320 | 514 | 154 | 210 |
| 8 | 1.0 | 490 | 516 | 157 | 215 |
| 9 | 0.5 | 1120 | 451 | 117 | 146 |
| 10 | 0.5 | 50 | 413 | 108 | 205 |

As shown in the table, among positive electrode active material samples 1 to 10 each having a concentrated presence of W on surfaces of primary particles and a presence of Mg throughout primary particles, according to batteries 1 to 9 using positive electrode active material samples each containing Mg in an amount higher than 50 ppm relative to the total amount of the positive electrode active material, as compared to battery 10 using a positive electrode active material sample containing Mg an amount of 50 ppm or lower, the low temperature output power at the low SOC clearly increased both at 0° C. and −30° C. With respect to batteries according to Examples 1-8 each with the positive electrode active material containing Mg in an amount higher than 50 ppm, but 1000 ppm or lower (more specifically, 100 ppm or higher, but 800 ppm or lower), especially significant effects to increase the low-SOC output power were obtained. When the Mg content was higher than 1000 ppm (Example 9), the low temperature (−30° C.) output power at the mid SOC decreased. Thus, in a lithium-ion secondary battery having the constitution described above, from the standpoint of combining high levels of output power both at a low SOC and a mid SOC, it is preferable that the Mg content is in a range higher than 50 ppm up to 1000 ppm. With such a Mg content it has been confirmed that effects to increase the low-SOC output power without significantly impairing the output power at a mid SOC could be obtained throughout when the W content is in a range of 0.05% by mole or higher, but 2% by mole or lower.

Figure 7:
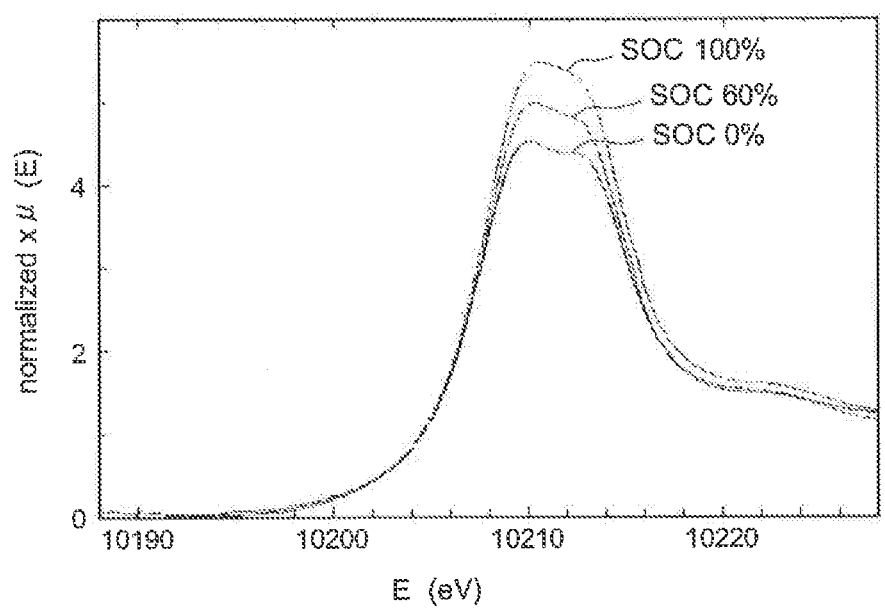
FIG. 7 shows a chart of X-ray absorption fine structure spectra with respect to W in the positive electrode active material according to an embodiment.
Figure 8:
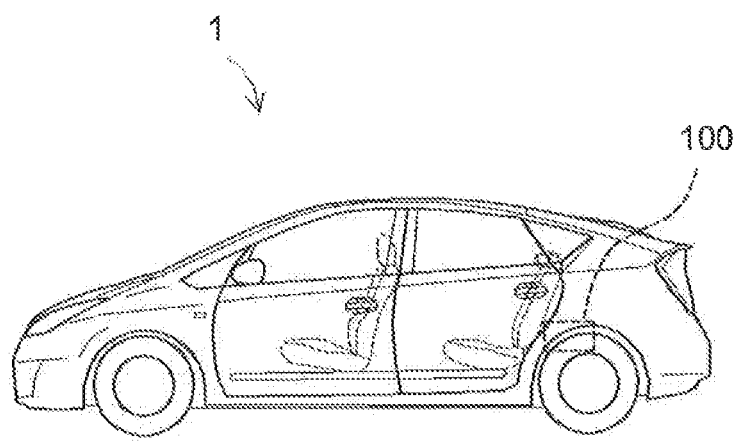
FIG. 8 shows a side view schematically illustrating a vehicle (automobile) with a lithium secondary battery loaded thereon.

The following experiment was carried out so as to confirm that a concentrated presence of W on surfaces of primary particles contributed to charging and discharging in the positive electrode active material disclosed herein. That is, several batteries according to Example 1 were obtained, and these were subjected to the conditioning process and rated capacity measurements. The batteries were adjusted to three different states of Charge, namely, the unchanged state (0% SOC) after the rated capacity measurement, charged at 25° C. to 60% SOC at a constant current of 1 C, and charged at 25° C. to 100% SOC; and the batteries were disassembled to recover the positive electrode active material. The respective positive electrode active materials at 0% SOC, 60% SOC and 100% SOC were subjected to X-ray absorption line structure (XAFS) spectroscopy measurements with respect to W. The results are shown in FIG. 7. This chart shows that as the SOC increases, the peak intensity of W increases. An increase in the peak intensity can be considered to indicate an increase in the number of electron holes, that is, an increase in the oxidation state. This result suggests that a concentrated presence of W on surfaces of primary particles contribute to charging and discharging via an increase in the oxidation state caused by an increased SOC, and may even serve to increase the charge-discharge efficiency (further, to increase the output power in a low SOC range).

Although the present invention have been described in detail above, the embodiments described above are merely examples, and the art disclosed herein includes various modifications and changes made to the specific examples illustrated above.

REFERENCE SIGNS LIST 1 vehicle
10 battery case
12 opening
14 lid
20 wound electrode body
30 positive electrode sheet (positive electrode)
32 positive current collector
34 positive electrode material layer
38 positive terminal
40 negative electrode sheet (negative electrode)
42 negative current collector
44 negative electrode material layer
48 negative terminal
50 separator
90 non-aqueous electrolyte solution
100 lithium-ion secondary battery (lithium secondary battery)

The invention claimed is:

1. A lithium secondary battery comprising a positive electrode, a negative electrode, and a non-aqueous electrolyte, wherein:
the positive electrode comprises a positive electrode active material in a form of secondary particles as aggregates of primary particles of a lithium transition metal oxide;
the positive electrode active material comprises at least one species of Ni, Co and Mn, and further comprises W and Mg;
the W is present, concentrated on surfaces of the primary particles;
the Mg is present throughout the primary particles; and
the Mg content in the positive electrode active material is higher than 50 ppm relative to the total amount of the positive electrode active material based on the mass.

2. The lithium secondary battery according to claim 1, wherein the Mg content in the positive electrode active material is 1000 ppm or lower relative to the total amount of the positive electrode active material based on the mass.

3. The lithium secondary battery according to claim 1, wherein the W content in the positive electrode active material is 0.05% by mole or higher, but 2% by mole or lower, with the combined amount of Ni, Co and Mn being 100% by mole.

4. The lithium secondary battery according to claim 1, wherein the lithium transition metal oxide is an oxide comprising all Ni, Co and Mn and having a layered structure.

5. The lithium secondary battery according to claim 1 to be used as a driving power supply for a vehicle.

6. A method for producing a positive electrode active material for use in a lithium secondary battery, with the positive electrode active material being in a form of secondary particles as aggregates of primary particles of a lithium transition metal oxide, comprising at least one species of Ni, Co and Mn, and further comprising W and Mg, the W being present, concentrated on surfaces of the primary particles, the Mg being present throughout the primary particles, and the Mg content in the positive electrode active material being higher than 50 ppm based on the mass, the method comprising:
preparing an aqueous solution $Aq_A$ containing the at least one species of Ni, Co and Mn as well as Mg;
preparing, as a separate solution apart from the preparation of the aqueous solution $Aq_A$, an aqueous solution $Aq_C$ containing W;
mixing the aqueous solution $Aq_A$ and the aqueous solution $Aq_C$ under a basic condition to precipitate a hydroxide containing the at least one species of Ni, Co and Mn as well as Mg and W, wherein the solutions $Aq_A$ and $Aq_C$ are separated from one another until the mixing under the basic condition;
mixing the hydroxide and a lithium compound; and
calcining the mixture to form the lithium transition metal oxide.

7. The method according to claim 6, wherein the hydroxide is precipitated at a pH maintained at 11 to 14.

8. The method according to claim 6, wherein the hydroxide is precipitated under the basic condition being maintained by using a basic aqueous solution comprising at least ammonia.

9. A lithium secondary battery comprising the positive electrode active material produced by the method according to claim 6.

* * * * *